(12) United States Patent
Weinstein et al.

(10) Patent No.: US 7,888,294 B2
(45) Date of Patent: Feb. 15, 2011

(54) ENERGY RECOVERY AND REUSE FOR GEL PRODUCTION

(75) Inventors: Jeremy Lynn Weinstein, Duncan, OK (US); Jason McIntyre, Duncan, OK (US); Bruce Carl Lucas, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 232 days.

(21) Appl. No.: 12/233,398

(22) Filed: Sep. 18, 2008

(65) Prior Publication Data

US 2010/0069270 A1    Mar. 18, 2010

(51) Int. Cl.
*C09K 8/68* (2006.01)
*E21B 36/00* (2006.01)
*E21B 43/24* (2006.01)

(52) U.S. Cl. .................... 507/203; 507/200; 166/303

(58) Field of Classification Search ............ 507/200, 507/203; 166/303
See application file for complete search history.

(56) References Cited

U.S. PATENT DOCUMENTS

| 4,336,145 | A | 6/1982 | Briscoe |
| 4,466,890 | A | 8/1984 | Briscoe |
| 5,382,411 | A | 1/1995 | Allen |
| 5,426,137 | A | 6/1995 | Allen |
| 6,817,376 | B2 | 11/2004 | Morgan et al. |
| 6,854,874 | B2 | 2/2005 | Graham, Sr. |
| 7,104,328 | B2 * | 9/2006 | Phillippi et al. .......... 166/308.5 |
| 7,125,162 | B2 | 10/2006 | Graham, Sr. |
| 7,409,901 | B2 | 8/2008 | Lucas et al. |
| 2008/0242747 | A1 * | 10/2008 | Lucas et al. .................. 516/99 |

* cited by examiner

*Primary Examiner*—Timothy J. Kugel
*Assistant Examiner*—Atnaf Admasu
(74) *Attorney, Agent, or Firm*—John W. Wustenberg; Fish & Richardson P.C.

(57) ABSTRACT

The present disclosure relates to systems and methods for producing a fracturing gel using a preheated hydration fluid. The hydration fluid can be preheated using heat energy recycled from a different part of the operation. Recycling the heat energy can, in certain instances, reduce gel production costs and gel hydration times while improving gel yield.

23 Claims, 3 Drawing Sheets

ENERGY RECOVERY AND REUSE FOR GEL PRODUCTION

TECHNICAL FIELD

The present disclosure relates generally to fluid hydration, including the hydration of fracturing fluids.

BACKGROUND

Various hydratable materials may be used to viscosify fracturing fluids. The hydratable material selected for a particular use may be based on a number of factors, including the rheological properties, economics, and hydration ability of the material. The term "hydration" is used to describe the process wherein the hydratable material solvates or absorbs water (hydrates) and swells in the presence of water.

SUMMARY

One aspect of producing a gel encompasses generating a fluid flow between an inlet and an outlet. The fluid flow at the inlet may include a flow of hydration fluid and the flow at the outlet may include a flow of gel mixture. A temperature of the flow of hydration fluid may be elevated by transferring energy from the gel mixture flow to the hydration fluid flow, and a flow of hydratable material may be combined with the flow of hydration fluid to form a gel mixture.

Another aspect of producing a gel may include combining a hydration fluid and a hydratable material to form a gel mixture, and heating at least one of the hydration fluid or the hydratable material to a selected temperature using heat energy from the gel mixture.

A further aspect encompasses a system having a flow of hydratable fluid, a flow of hydratable material, a mixer operable to combine at least a portion of the flow of hydration fluid with the flow of hydratable material to form a flow of gel mixture, and a first heat exchanger operable to transfer heat from the flow of gel mixture to the flow of hydration fluid to increase a temperature of the flow of hydration fluid.

The various aspects may include one or more of the following features. Hydration of a gel mixture may be performed at an elevated temperature. For example, a gel mixture may be hydrated at an elevated temperature by passing the gel mixture through a hydration tank for a predetermined period of time. Also, a characteristic of hydration time may be monitored and an adjustment may be made to maintain a selected hydration time. Combining the flow of hydratable material with the flow of hydration fluid to form the gel mixture may include combining a first portion of the fluid with the hydratable material to form a first mixture, and combining a second portion of the fluid with the first mixture. A temperature of the hydration fluid may be sensed, and a temperature of the hydration fluid may be altered in order to maintain a selected temperature. A temperature of the hydration fluid may be elevated by transferring energy from the flow of gel mixture to the flow of hydration fluid in a heat exchanger. Also, a second heat exchanger may be used to add energy for elevating the temperature of the flow of hydration fluid. Further, an inlet and an outlet of a system for forming a gel may be coupled to form a continuous circuit. The flow of hydration fluid may be circulated through the continuous circuit while heat energy is added to attain a selected temperature. The inlet and outlet may be decoupled when the flow of hydration fluid has attained the selected temperature.

The various aspects may also include one or more of the following features. Heating at least one of the hydration fluid or the hydratable material to a selected temperature using heat energy from the gel mixture may include transferring heat from the gel mixture to the hydration fluid using a heat exchanger. A temperature of the hydration fluid may be sensed, and the sensed temperature may be compared to a selected temperature. An amount of heat added to the hydration fluid may be altered based on the comparison to maintain the selected temperature.

The various aspects may further include one or more of the following features. A second heat exchanger may be operable to adjust a temperature of the flow of hydration fluid. A control system may also be included to maintain the flow of hydration fluid at a selected temperature. The control system may include a temperature sensor for sensing a temperature of the flow of hydration fluid, a processor for comparing the sensed temperature with the selected temperature, and an output signal based on the comparison of the sensed temperature and the selected temperature. The output signal may be used to alter a setting of the second heat exchanger. A hydration tank may be used to retain the gel mixture for a selected period of time to promote hydration of the gel mixture. At least one pump may be used to produce at least one of the flow of hydration fluid or the flow of gel mixture. The first heat exchanger may be a counter-flow heat exchanger. Alternately, the first heat exchanger may be a device operable to transmit at least a portion of the heat energy of the flow of gel mixture to the flow of hydration fluid.

The details of one or more implementations of the present disclosure are set forth in the accompanying drawings and the description below. Other features, objects, and advantages will be apparent from the description and drawings, and from the claims.

DETAILED DESCRIPTION

Heating may be used to increase the yield of a hydratable material in hydration. Therefore, a specified viscosity can be achieved with a lesser amount of hydratable material than would otherwise be used. An aqueous component, such as water or water and other materials, is mixed with the hydratable material. In some instances, the hydratable material is dry gel in a powder form. One or more of the aqueous component or the hydratable material is heated prior to mixing the hydratable material with the aqueous component. Other, additional components may also be added to the composition and may or may not be heated.

Figure 1:
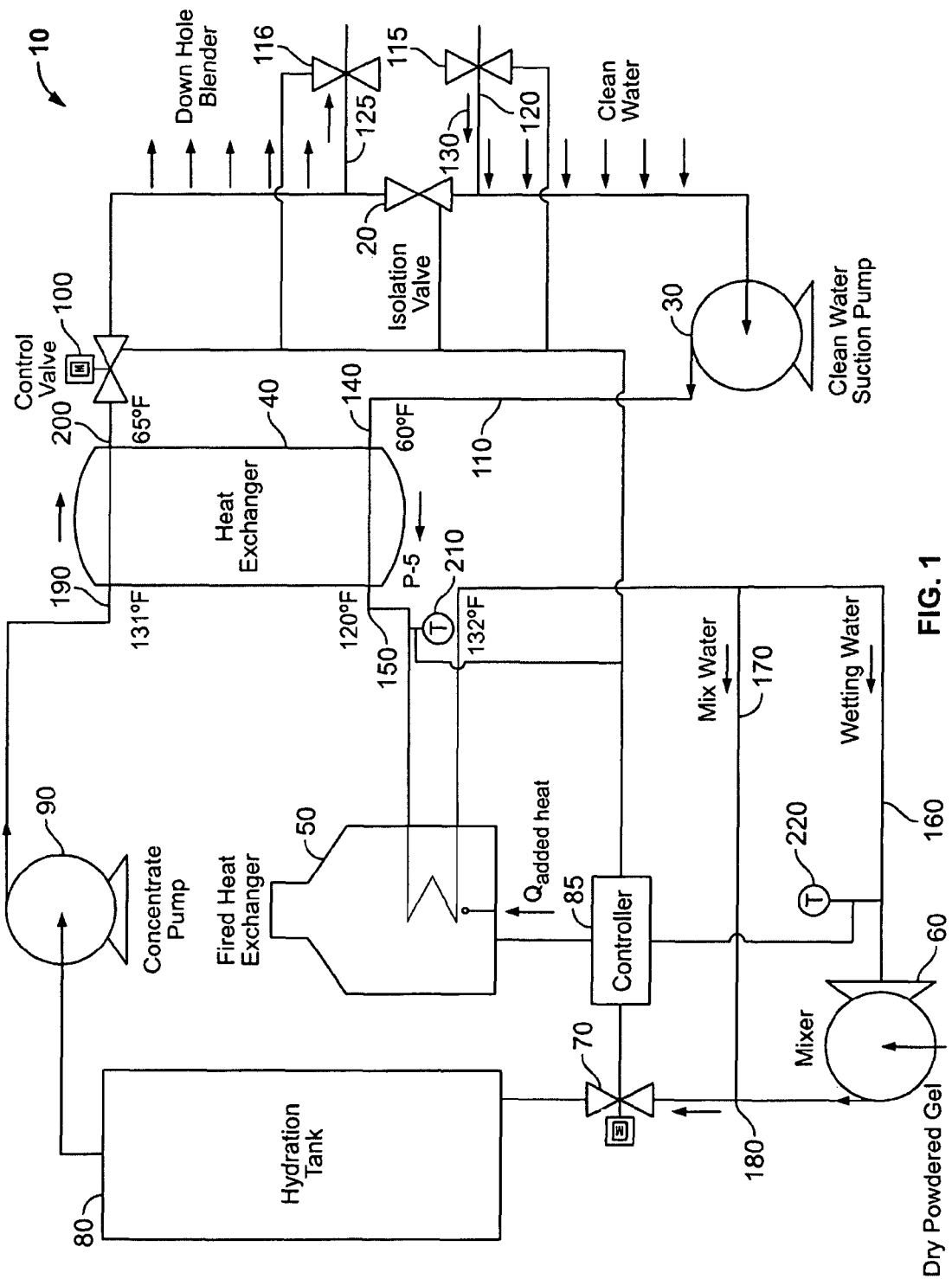
FIG. 1 is a schematic diagram of an example implementation for hydrating a hydratable material in which heat energy is recycled.

FIG. 1 shows a schematic diagram of a system 10 for hydrating a hydratable material, such as a bulk dry gel material, such as in powder form. For convenience, "dry gel" or "dry gel material" will be used herein to refer to a hydratable material within the present disclosure, and "gel," "gel mixture," or "hydrated gel" will be used to refer to the partially or fully hydrated dry gel, including gel concentrate. Although aspects of the disclosure are discussed in relation to a gel, the present disclosure is applicable to other types of well injection mixtures that may include different or additional types of hydratable materials. Other example well injection mixtures may include a cement or concrete mixture. For example, a cement or concrete mixture may be injected into a well to anchor a casing within the well. Still other types of well injection mixtures are also applicable.

Figure 2:
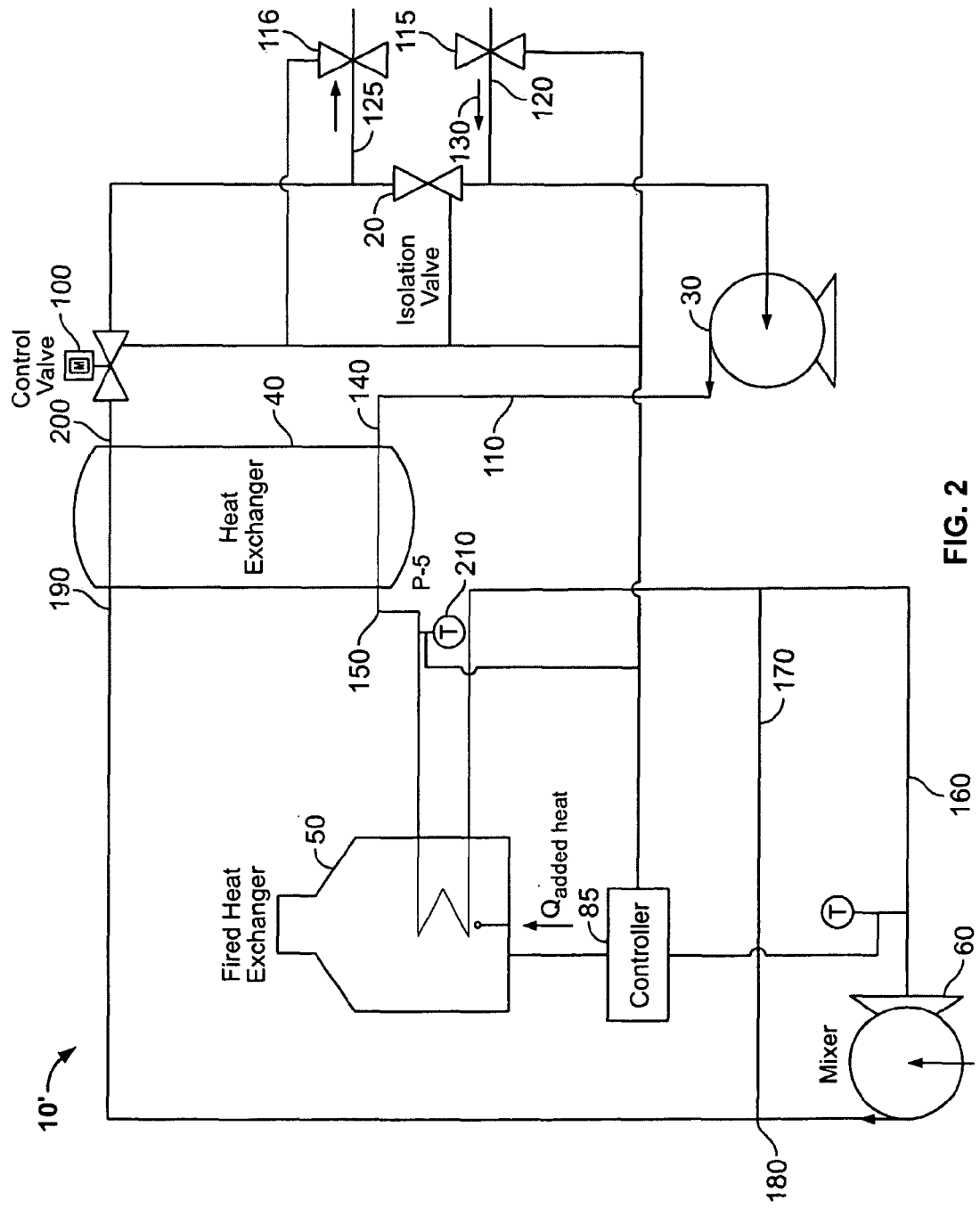
FIG. 2 is a schematic diagram of an example system for hydrating a hydratable material using recycled heat in which the system lacks a hydration tank.

The gel, once hydrated, may be injected down a wellbore for performing a fracturing operation. The system 10 may include an isolation valve 20, a first pump 30, a first heat exchanger 40, a second heat exchanger 50, a mixer 60, a first control valve 70, an optional hydration tank 80, a second pump 90, a second control valve 100, and a conduit network 110. The system may also include a valve 115 provided on an inlet conduit 120 and a valve 116 provided on an outlet conduit 125. The isolation valve 20 and valves 115, 116 may be used in combination to preheat incoming hydration fluid to a desired temperature, as discussed below. The system 10 shown in FIG. 1 may have additional or fewer components as that shown while still being operable to hydrate the gel according to the present disclosure. For example, in some implementations, explained in more detail below, the hydration tank 80 may be eliminated in some cases. For example, a system 10' shown in FIG. 2 does not include the hydration tank 80. Additionally, the second pump 90 and the first control valve 70 may also be omitted. Consequently, a conduit exiting the mixer 60 extends to an inlet of the first heat exchanger 40. Further, some implementations of the system 10 may include a control system 85, also discussed in more detail below, for controlling one or more aspects of the hydration process.

Examples of dry gel materials that may be used include natural and derivatized hydratable polymers, such as modified guar gums. Examples of modified guar gums include carboxyalkyl derivatives such as carboxymethyl guar, and hydroxyalkyl derivatives such as hydroxypropyl guar (HPG), and carboxymethylhydroxypropyl guar (CMHPG). Other examples include derivatives such as carboxyalkylguar, carboxyalkylhydroxyalkylguar, carboxyalkylcellulose, carboxyalkylhydroxyalkylcelluose and the like, wherein the alkyl groups may comprise methyl, ethyl, or propyl groups. Still other examples include cellulose, karaya, xanthan, tragacanth, gum ghatti, carrageenin, psyllium, and gum acacia. Dry gel materials may also include, for example, hydratable synthetic polymers and copolymers such as polyacrylate, polymethacrylate, acrylamide-acrylate copolymers, and maleic anhydride methylvinyl ether copolymers. Other dry gel polymers include hydroxyethyl cellulose (HEC) and carboxymethylhydroxyethyl cellulose (CMHEC). The guar gums may be ground to different particle sizes. In some cases, the guar gums may include a coating or associated material. Typically, these modifications may affect the speed of hydration, final viscosity, etc. The examples provided herein are not intended to present a comprehensive list of such materials but, rather, are presented as some examples within the scope of the disclosure.

The conduit network 110 is operable to transport an incoming hydration fluid and a mixture of the incoming fluid and gel ("mixture") material through the system 10. The hydration fluid is used to hydrate the dry gel material to form a fully constituted ("finished") gel or gel concentrate. Although referred to as "hydrated," the incoming fluid need not be water. For example, the hydrating fluid can include a water solution (containing water and one or more other elements or compounds) or another liquid. Accordingly, the hydration fluid may include water or other fluids capable of hydrating the gel and available on-hand at a well site. For example, suitable drilling mud may be used as the hydration fluid. "Mud" is a term that is generally synonymous with drilling fluid and that encompasses fluids used in hydrocarbon drilling operations, especially fluids that contain significant amounts of suspended solids, emulsified water, or oil. A gel concentrate is a mixture of an amount of the bulk gel powder along with a volume of the hydration fluid less than an amount to produce a fully constituted or finished gel. In some cases, the system 10 may be used to produce a gel concentrate. Alternatively, the system 10 may be used to produce a finished gel. In certain instances, a gel concentrate may be produced where a large volume of gel is required that may exceed the capacity of the selected first and/or second heat exchangers 40, 50. In certain instances, the size of the heat exchangers would be limited by their ability to be transported to the job site (e.g., on a trailer).

The incoming hydration fluid (represented by arrow 130) may be drawn into the conduit network 110, via an inlet conduit 120 and the valve 115, by the first pump 30. Prior to mixing the hydration fluid with the dry gel, the isolation valve 20 may be opened and the valve 116 may be closed to fill the system 10 with hydration fluid. After a desired amount of hydration fluid has entered the system 10, the valve 115 may be closed. The hydration fluid may be circulated through the conduit network 110 as the second heat exchanger 50 heats the hydration fluid during a warm-up cycle. The warm-up cycle brings the fluid in the first heat exchanger 40 up to a temperature at which it contributes a specified amount of heat transfer to the incoming hydration fluid 30. In certain instances, the specified amount of heat transfer is substantially the same amount of heat transfer contributed by the first heat exchanger 40 during operation of the system 10 outside of the warm-up cycle (i.e., during normal operation making gel or gel concentrate). The warm-up cycle may be ceased when the hydration fluid has reached a desired temperature, such as measured at an outlet of the second heat exchanger 50. When the warm-up cycle is ceased, the isolation valve 20 may be closed and the valve 116 opened. Further, addition of the dry gel to the hydration fluid may also be initiated.

The hydration fluid is conveyed through the first heat exchanger 40 where the fluid's temperature is elevated from an inlet temperature at 140 to an outlet temperature at 150. Combining a gel mixture at an elevated temperature, for example, by heating the hydration fluid prior to mixing the gel, in certain instances, reduces hydration time and improves the yield of the hydratable material. Hydrating a gel at an elevated temperature is discussed in U.S. patent application Ser. No. 11/692,752, titled "Gel Yield Improvements," filed on Mar. 28, 2007, and inventor by Bruce C. Lucas, Glenn H. Weightman, Harold G. Walters, Jimmie D. Weaver, Steven F. Wilson, and Billy F. Slabaugh ("'752 Application"). A target value for optimizing the hydration time of a gel mixture may be determined by experimentation and may be dependent upon the hydratable material used and the manner in which the gel mixture is created. For example, as discussed below, the gel mixture may be created by combining the flow of hydration fluid with a flow of dry gel powder. Additionally, in some implementations, the hydration fluid may be heated and the dry gel combined therewith may also be heated so that, upon mixing, the resulting gel mixture has the desired temperature. Further, according to some implementations, a dry powder mixture designated WG-35 and produced by Halliburton Energy Services, Inc., of 1401 McKinney Street, Suite 2400, Houston, Tex. 77010 has an optimized hydration temperature of 132° F. In some implementations, the hydration fluid's inlet temperature at 140 may be between 60° F. and 70° F., and the outlet temperature from the first heat exchanger may be 120° F. The inlet and outlet temperatures may be selected to be different temperatures than those identified above, and the first heat exchanger 40 may be sized, selected, and/or designed to provide the desired outlet temperature. Using recycled heat to produce a gel as described above results in an identical or substantially identical gel while reducing the amount of energy consumed and the associated energy cost.

The first heat exchanger 40 may be a heat exchanger that is operable to transfer heat energy from one part of the system 10 to a different part of the system 10. As shown in the implementation of FIG. 1, the first heat exchanger 40 transfers heat from the gel mixture to the hydration fluid. Consequently, the outlet temperature of the gel mixture is decreased relative to the inlet temperature of the gel mixture, and the recovered heat energy is transferred to the hydration fluid, causing the temperature of the hydration fluid to increase. In some implementations, the heat exchanger 40 may be a regenerative heat exchanger. For example, a counter-flow heat exchanger may be used wherein flow from hydration tank 80 flows counter to flow from pump 30. In still other implementations, the heat exchanger 40 may include plate-type heat exchangers, a tube-and-shell type heat exchangers, or a spiral heat exchangers. However, other types of heat exchanger may be utilized for heat exchanger 40 and, thus, the types of heat exchangers described herein are not intended to be limiting. Alternately, the first heat exchanger 40 may be eliminated and the hydration tank 80 utilized as a heat exchanger. In such implementations, the hydration tank 80 may include a cavity in contact with a portion of the hydration tank 80. The hydration fluid may be passed through the cavity at which time heat from the gel mixture in the hydration tank 80 is passed into the incoming hydration fluid, increasing the temperature thereof.

Utilizing a heat exchanger to transfer heat energy from one part of the system 10 to another reduces an amount of energy required to heat the hydration fluid to a desired temperature and, therefore, reduces the costs associated therewith. For example, in some implementations, recovering heat energy using a heat exchanger can reduce heating energy input into the system 10 by approximately 90%. Although only one heat exchanger is illustrated (first heat exchanger 40), the system 10 may include additional heat exchangers.

The hydration fluid may be conveyed to the second heat exchanger 50 where the hydration fluid's temperature is raised to a desired outlet temperature for hydrating the gel. In some implementations, the outlet temperature, for exampled measured at 160, may be 132° F., although the outlet temperature may be any desired temperature, such as to optimize hydration. The second heat exchanger 50 may be a non-regenerative heat exchanger, such as a boiler or direct fired heat exchanger in which energy from outside the system 10 is added to heat the hydration fluid. Alternately, the second heat exchanger 50 may recycle heat energy from another process. For example, the second heat exchanger 50 may transfer heat energy from one or more engine units or hydraulic components, or the second heat exchanger may transfer heat from another fluid source (e.g., a recovered formation fluid) or a mechanical shear device (e.g., a choke through which a high flow rate is passed). The second heat exchanger 50 may be sized, selected, and/or otherwise designed to provide a selected temperature increase in the hydration fluid, e.g., to produce the desired outlet temperature.

When the hydration fluid is heated to a desired temperature, all or a portion of the hydration fluid may be mixed with the dry gel powder by the mixer 60. In some implementations, the mixer 60 may be a centrifugal mixer, such as of a type described in U.S. Pat. No. 7,048,432, Alternately, the mixer 60 may be an eductor used to generate a hydrated gel material.

The gel mixture exits the mixer 60 where additional hydration fluid from a conduit 170 may be added at 180. At 180, the resulting gel mixture may have a composition reflective of a gel concentrate or a finished gel, although hydration may not be complete. Although the system 10 is capable of producing both a finished gel and gel concentrate, production of a gel concentrate, as opposed to a completed gel, provides significant advantages. For example, producing a gel concentrate can significantly improve (i.e., reduce) the reaction time between changing the properties of the gel produced and the time delay after which a modified gel is introduced into the well. For example, system 10 decreases a time required to achieve a desired viscosity of the gel because of the reduced hydration time. Additionally, mixing the dry gel with only a portion of the hydration fluid flow and later adding the remainder of the hydration fluid flow reduces the total hydration time in contrast to adding the entire hydration fluid flow at one step. Further, producing a finished gel at a selected viscosity using a gel concentrate requires less heat energy. The reason for this is at least partially because the temperature to which the hydration fluid must be heated to produce the finished gel at the selected viscosity is lower than if the finished gel were produced without using a gel concentrate.

Mixing the dry gel and hydration fluid at an elevated temperature produces several benefits. For example, the increased temperature reduces the hydration time, i.e., the time required to hydrate the dry gel powder with the hydration fluid. For example, a volume of the mixture that does not have an elevated temperature may require three to five minutes to fully hydrate, whereas, when mixed at an elevated temperature, the same volume of mixture may be fully hydrated in less than a minute. This reduction in hydration time reduces the size of the hydration tank 80 since the transient time of the mixture in the hydration tank 80 is substantially reduced. Passage of the gel mixture through the hydration tank 80 also provides an opportunity for de-aeration of gel mixture (i.e., removal of gas from the gel mixture) prior to entering the first heat exchanger 40.

In some implementations, the hydration tank 80 may be completely eliminated due to the substantially reduced hydration time. For example, by fracturing operations requiring lower flow rates of the hydrated gel, the hydration tank 80 may be completely eliminated since the elapsed time between mixing the dry gel and hydration fluid and the introduction of the gel into the well may be approximately the same as the hydration time. For example, in some implementations, the transient time required to fully hydrate the gel mixture may substantially correspond to the time required for the gel mixture to pass through the first heat exchanger 40. Thus, the gel mixture will be substantially hydrated by the time the mixture is introduced into the well without the need for a hydration tank. Reducing the time to fully hydrate the gel mixture allows for reducing the time between when a change to the mixture is implemented and when the hydrated gel with the new mixture is introduced into the wellbore. This can be advantageous when a viscosity change in the finished gel (effected by altering the gel mixture) is needed. Therefore, a viscosity change of the finished gel may be implemented more rapidly.

In some implementations, the heat exchanger may be provided with a vent for evacuating gas therefrom. For example, the hydration tank 80 typically has an open top and acts as a vent to the system 10. When the hydration tank 80 is omitted, an alternate venting mechanism can be provided in the system 10, and in certain instances, may be provided at the heat exchanger. The check valve may be used to expel gas contained in the system 10. In some instances, a check valve may be provided at one or more locations of the system 10 to expel the captured gas.

Also, the increased temperature, in certain instances, improves yield of the hydrated gel. That is, the increased temperature reduces the amount of dry gel required to form a gel mixture with a selected viscosity. For example, heating the hydration fluid prior to mixing with the dry gel may improve yield by ten percent (10%). As a result, less dry gel is consumed, resulting in a material and cost savings. Additionally, because heat from another part of the system 10 is used to increase the temperature of the hydration fluid and, hence, the gel mixture, an energy savings and associated costs are also realized. A further benefit is that the heated gel mixture produces a more consistent hydration time (i.e., the time required to fully hydrate the dry gel). Moreover, a gel attaining a selected viscosity using up to 10% less dry gel reduces contamination of a fracture produced by the gel during a fracturing operation. Consequently, production of the gel or gel concentrate by the system 10, in certain instances, is better controlled, producing a more consistent gel product, while also having improved fracturing performance.

The gel mixture passes through the first control valve 70, which is operable to control a flow rate of the gel mixture entering into the hydration tank 80, if present. The first control valve 70 is operable to control a level of the gel mixture in the hydration tank 80. The first control valve 70 may be a manually adjustable valve or an automated valve coupled to the control system 85, discussed below. The hydration tank 80 retains the gel mixture for a desired period of time to allow the gel mixture to fully hydrate. The amount of time the gel mixture remains in the hydration tank 80 may be controlled by a flow rate of the gel mixture and/or the size of the hydration tank 80. For example, the fluid level of the gel mixture within the hydration tank 80 may be controlled to adjust an amount of time that the gel mixture hydrates within the hydration tank 80. However, because the improved hydration of the gel mixture requires considerably less time due to the increased temperature of the gel mixture, the first control valve 70 may be eliminated. Additionally, because of the improved hydration time, automated control of the first control valve 70, such as by the control system 85, may be eliminated.

The hydrated gel is pumped by the second pump 90 through the first heat exchanger 40 where the hydrated gel is cooled to a selected temperature. For example, in some implementations, the gel may be cooled from an inlet temperature at 190 of approximately 131° F. to an outlet temperature at 200 of 65° F., which may be close to the inlet temperature at 140 of the incoming hydration fluid. However, the inlet and outlet temperatures of the gel may be different and selected as desired. For example, the outlet temperature 200 of the gel may be selected based on the type of gel used, the type of operation being performed, or any other reason. At least a portion of the heat removed from cooling the gel may be transferred to the hydration fluid also entering the first heat exchanger 40, as explained above. Consequently, heat energy is recycled, and a savings is realized. In addition to recycling energy, cooling the hydrated gel results in a gel that is more easily pumped. For example, a gel at a higher temperature has a lower vapor pressure and is, therefore, more likely to cause cavitation in a pump. However, a lower temperature gel has a higher vapor pressure and is, thus, less likely to cause cavitation in a pump.

A second control valve 100 meters the flow rate of the gel out of the system 10, as desired. The second control valve 100 may also be manually controlled or automatically controlled, such as by being coupled to the control system 85. Although not shown in FIG. 1, other additives may be incorporated. For example, one or more additives may be introduced into the hydrating fluid prior to mixing with the dry gel, after mixing of the dry gel, or after the gel has passed through the system 10. The finished gel may be outputted from the system 10 through the outlet conduit 125 and transported to a further mixing device prior to introducing the finished gel into the wellbore. The additional mixer may be used to incorporate a proppant into the gel and/or other desired additive. Additional diluting fluid may also be added to the gel prior to introduction, for example, where the system 10 is configured to produce a gel concentrate. The additional diluting fluid may be added to produce a completed gel prior to introduction of the gel into the wellbore. For example, addition of diluting fluid to the gel prior to introduction of the gel into the wellbore may, in certain instances, provide better control of the viscosity or other properties of the gel. Accordingly, the time between a requested change to a gel's viscosity and introduction of a gel with the desired viscosity may be reduced. In some cases the diluting fluid may be the same as the hydrating fluid although, once added, the hydrating fluid is not further hydrating the gel material within the gel concentrate.

As indicated above, the system 10 may include a control system 85 to automatically control one or more aspects of the invention. For example, the control system 85 may be operable to maintain a temperature of the hydration fluid. For example, the control system 85 may monitor the outlet temperature (for example, at 150) of the hydration fluid exiting the first heat exchanger 40, such as with a temperature sensor 210, and, based on the detected temperature, adjust the amount of heating of the second heat exchanger 50 so that the outlet temperature at 160 of the hydration fluid maintains a selected value. The control system 85 may utilize a temperature sensor 220 to detect the outlet temperature at 160. The control system 85 may also control settings of one or more of the isolation valve 20, valves 115, 116, and first and second control valves 70, 100 to control flow through the system.

The control system 85 may include a control unit having a processor, a memory, an application stored in memory and/or executable by the processor, and information stored in memory and/or used by the processor.

The control unit may be implemented in digital electronic circuitry, or in computer software, firmware, or hardware, including the structural means disclosed in this specification and structural equivalents thereof, or in combinations of them. The control unit can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processor executes instructions and manipulates data to perform the operations and may be, for example, a central processing unit (CPU), a blade, an application specific integrated circuit (ASIC), or a field-programmable gate array (FPGA). The control system 85 may include a single processor, or the control system 85 may use multiple processors according to particular needs. Reference to a single processor is meant to include multiple processors where applicable. Processors suitable for the execution of a computer program include, by way of example, both general and special purpose microprocessors, and any one or more processors of any kind of digital computer. Generally, the processor will receive instructions and data from ROM or RAM or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The memory may include any memory or database module and may take the form of volatile or non-volatile memory including, without limitation, magnetic media, optical media, random access memory (RAM), read-only memory (ROM), removable media, or any other suitable local or remote memory component. The memory may include application data for one or more applications, as well as data involving VPN applications or services, firewall policies, a security or access log, print or other reporting files, HTML files or templates, related or unrelated software applications or sub-systems, and others. Consequently, the memory may also be considered a repository of data, such as a local data repository for one or more applications.

The control system 85 may also include an output device, such as a display device, e.g., a cathode ray tube ("CRT") or LCD (liquid crystal display) monitor, for displaying information to the user as well as an input device, such as a keyboard and a pointing device, e.g., a mouse or a trackball, by which the user can provide input to the computer. Other kinds of devices can be used to provide for interaction with a user as well to provide the user with feedback. For example, feedback provided to the user can be any form of sensory feedback, e.g., visual feedback, auditory feedback, or tactile feedback; and input from the user can be received in any form, including acoustic, speech, or tactile input.

The application is any application, program, module, process, or other software that may utilize, change, delete, generate, or is otherwise associated with the data and/or information associated with one or more control operations of the system 10. "Software" may include software, firmware, wired or programmed hardware, or any combination thereof as appropriate. Indeed, application may be written or described in any appropriate computer language including C, C++, Java, Visual Basic, assembler, Perl, any suitable version of 4GL, as well as others. It will be understood that, while application may include numerous sub-modules, application may instead be a single multi-tasked module that implements the various features and functionality through various objects, methods, or other processes. Further, one or more processes associated with application may be stored, referenced, or executed remotely (e.g., via a wired or wireless connection) or may be internal to the control unit. For example, a portion of application may be a web service that is remotely called, while another portion of application may be an interface object bundled for processing at remote client. Moreover, application may be a child or sub-module of another software module or application (not illustrated). Indeed, application may be a hosted solution that allows multiple parties in different portions of the process to perform the respective processing.

Figure 3:
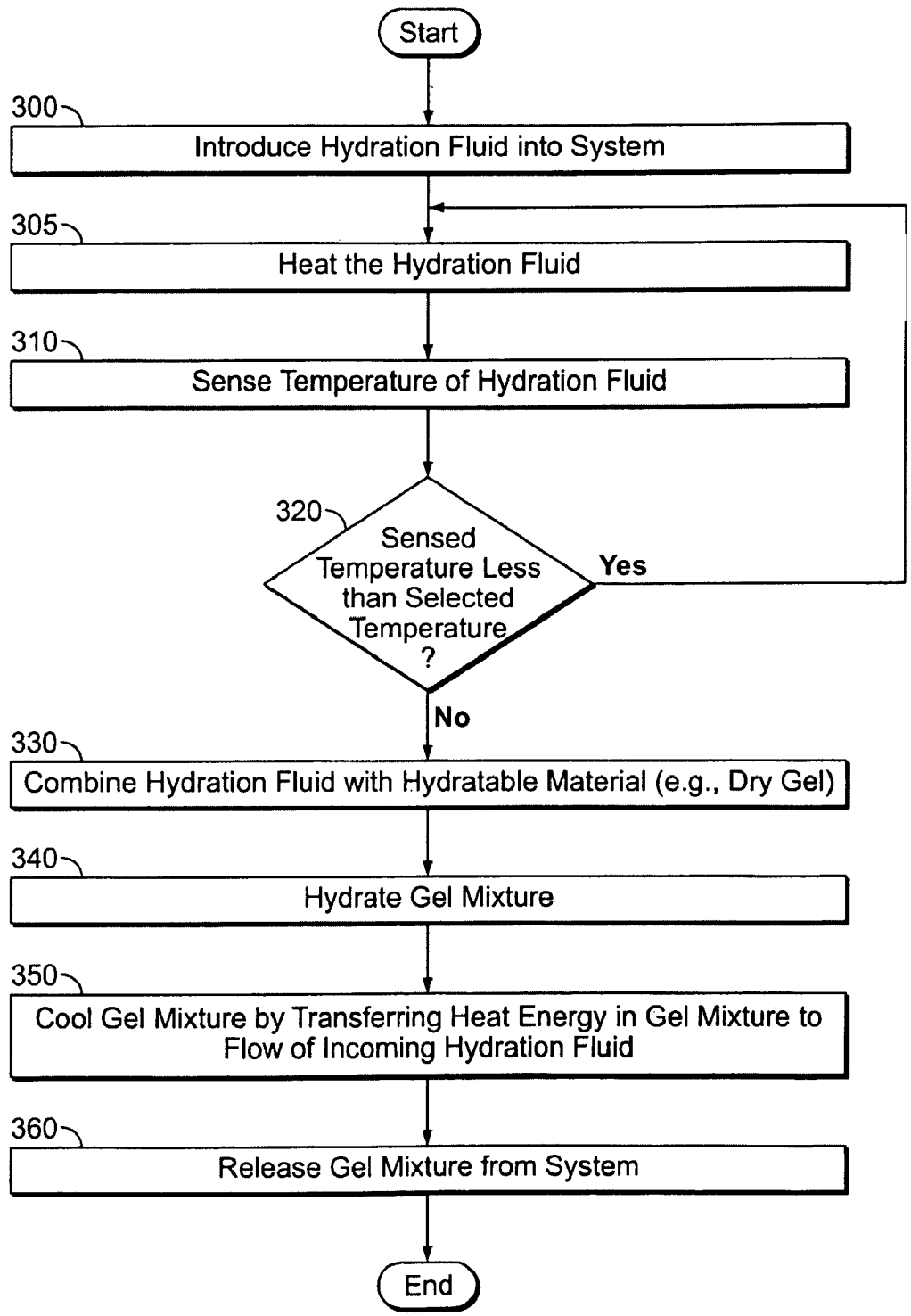
FIG. 3 is a flowchart for an example method for hydrating a hydratable material.

FIG. 3 represents a flowchart of operation of an example implementation of a system according to the present disclosure. At 300, a flow of hydration fluid is introduced into the system, such as system 10. At 305, the hydration fluid is heated. According to some implementations, the flow of hydration fluid is circulated through the system while being heated by a heat exchanger, such as the second heat exchanger 50. The flow of hydration fluid may be circulated and heated until a selected temperature has been achieved. At 310, a temperature of the hydration fluid, such as at a location upstream of the mixer 60 (e.g., the outlet temperature at 160 of the second heat exchanger 50), is sensed, and, at 320, the sensed temperature is compared to a selected value. At 330, if the sensed temperature of the hydration fluid is less than the selected temperature, heating of the hydration fluid is continued. For example, the hydration fluid may be circulated through the system until the hydration fluid attains the selected temperature. Circulating the hydration fluid while heating may include isolating the system from an inlet and outlet of the system to facilitate heating of the fluid. As explained, isolation of the system may be achieved with one or more valves. When the temperature of the hydration fluid reaches the selected value, isolation of the system is removed and the hydration fluid is made to follow an open path through the system, such as by manipulation of one or more valves.

At 330, when the sensed temperature of the hydration fluid satisfies the selected temperature, the flow of hydration fluid is combined with a flow of hydratable material, such as the dry gel described above. During mixing of the hydration fluid with the dry gel, all or only a portion of the flow of hydration fluid may be added, the remaining portion of the hydration fluid flow added subsequent to the mixing. The dry gel mixture may be produced at such proportions that a finished or complete gel is produced or only a gel concentrate, for which additional hydration fluid is added at a subsequent time. For example, the additional hydration fluid may be added after the gel has passed out of the system. Adding only a portion of the hydration fluid flow to the dry gel can provide the benefits described above. At 340, the gel mixture is hydrated while passing through the system. In some implementations, the gel mixture may be hydrated in a hydration tank. However, because the gel mixture is created with a hydration fluid at an elevated temperature, the time required to fully hydrate the gel mixture is significantly decreased. Thus, in some implementations, the hydration tank may be eliminated, in which cases the transient time of the gel mixture in the system between mixing and egress from the system may be sufficient to fully hydrate the gel.

At 350, the gel mixture is cooled, such as by passing the gel through a heat exchanger. As explained above, a regenerative heat exchanger, such as a counter-flow heat exchanger, may be used. Heat removed from the gel mixture may be recycled and used to heat the incoming hydration fluid, resulting in a cost savings. At 360, the gel is released from the system for a subsequent operation. For example, additional hydration fluid may be added (e.g., when the system produces a gel concentrate) or other additives (such as a proppant) may be added to the gel. Alternatively or in addition to, the gel may be introduced into a wellbore for a fracturing operation.

A number of implementations have been described. Nevertheless, it will be understood that various modifications may be made without departing from the spirit and scope of the present disclosure. Accordingly, other implementations are within the scope of the following claims.

What is claimed is:

1. A method for producing a gel comprising:
generating a fluid flow between an inlet and an outlet, the fluid flow at the inlet comprising a flow of hydration fluid and the flow at the outlet comprising a flow of a well injection mixture;
elevating a temperature of the flow of hydration fluid by transferring energy from the flow of the well injection mixture to the flow of hydration fluid; and
combining a flow of hydratable material with the flow of hydration fluid to form the flow of the well injection mixture.

2. The method of claim 1 further comprising hydrating the flow of the well injection mixture at the elevated temperature.

3. The method of claim 2, wherein hydrating the flow of the well injection mixture at the elevated temperature comprises flowing the flow of well injection mixture through a hydration tank for a predetermined time period.

4. The method of claim 2 further comprising:
monitoring a characteristic indicative of hydration time; and
making an adjustment to maintain a selected hydration time.

5. The method of claim 1, wherein combining the flow of hydratable material with the flow of hydration fluid to form the flow of the well injection mixture comprises:
combining a first portion of the fluid with the hydratable material to form a first mixture; and
combining a second portion of the fluid with the first mixture.

6. The method of claim 1 further comprising:
sensing a temperature of the hydration fluid; and
altering the temperature of the hydration fluid to maintain a selected temperature.

7. The method of claim 1, wherein elevating the temperature of the flow of hydration fluid by transferring energy from the flow of the well injection mixture to the flow of hydration fluid comprises transferring heat energy from the flow of the well injection mixture to the hydration fluid in a heat exchanger.

8. The method of claim 7, wherein elevating the temperature of the flow of hydration fluid by transferring energy from the flow of the well injection mixture to the flow of hydration fluid further comprises adding heat energy in a second heat exchanger.

9. The method of claim 1 further comprising:
coupling the inlet and the outlet to form a continuous circuit;
circulating the flow of hydration fluid;
adding heat energy to the circulating flow of hydration fluid to attain a selected temperature; and
decoupling the inlet and outlet when the flow of hydration fluid has attained the selected temperature.

10. The method of claim 1, wherein the flow of the well injection mixture is a flow of gel mixture.

11. A method comprising:
combining a hydration fluid and a hydratable material to form a well injection mixture; and
heating at least one of the hydration fluid or the hydratable material to a selected temperature using heat energy from the well injection mixture.

12. The method of claim 11, wherein heating at least one of the hydration fluid or the hydratable material to a selected temperature using heat energy from the well injection mixture comprises transferring heat from the well injection mixture to the hydration fluid using a heat exchanger.

13. The method of claim 11 further comprising:
sensing a temperature of the hydration fluid;
comparing the sensed temperature to a selected temperature; and
altering heating of the hydration fluid to maintain the selected temperature.

14. The method of claim 11, wherein the well injection mixture is a gel mixture.

15. A system comprising:
a flow of hydratable fluid;
a flow of hydratable material;
a mixer operable to combine at least a portion of the flow of hydration fluid with the flow of hydratable material to form a flow of a well injection mixture; and
a first heat exchanger operable to transfer heat from the flow of the well injection mixture to the flow of hydration fluid to increase a temperature of the flow of hydration fluid.

16. The system of claim 15 further comprising a second heat exchanger operable to adjust a temperature of the flow of hydration fluid.

17. The system of claim 16 further comprising a control system operable to maintain the flow of hydration fluid at a selected temperature.

18. The system of claim 17, wherein the control system comprises:
a temperature sensor for sensing a temperature of the flow of hydration fluid;
a processor for comparing the sensed temperature with the selected temperature; and
an output signal based on the comparison of the sensed temperature and the selected temperature, the output signal operable to alter a setting of the second heat exchanger.

19. The system of claim 15 further comprising a hydration tank operable to retain a portion of the flow of the well injection mixture for a selected period of time to promote hydration of the portion of the flow of the well injection mixture.

20. The system of claim 15 further comprising at least one pump operable to produce at least one of the flow of hydration fluid or the flow of the well injection mixture.

21. The system of claim 15, wherein the first heat exchanger is a counter-flow heat exchanger.

22. The system of claim 15, wherein the first heat exchanger is a device operable to transmit at least a portion of the heat energy of the flow of the well injection mixture to the flow of hydration fluid.

23. The system of claim 15, wherein the flow of the well injection mixture is a flow of gel mixture.

* * * * *